US008588553B2

(12) United States Patent
Bernard

(10) Patent No.: US 8,588,553 B2
(45) Date of Patent: Nov. 19, 2013

(54) SCALING METHOD AND DEVICE FOR IMAGE SIGNALS

(75) Inventor: Christophe Bernard, Paris (FR)

(73) Assignee: Zoran (France) S.A., Neuilly-Sur-Sein (FR)

( * ) Notice: Subject to any disclaimer, the term of this patent is extended or adjusted under 35 U.S.C. 154(b) by 220 days.

(21) Appl. No.: 13/148,779

(22) PCT Filed: Nov. 27, 2009

(86) PCT No.: PCT/EP2009/065985
§ 371 (c)(1),
(2), (4) Date: Aug. 10, 2011

(87) PCT Pub. No.: WO2010/091750
PCT Pub. Date: Aug. 19, 2010

(65) Prior Publication Data
US 2011/0311162 A1      Dec. 22, 2011

Related U.S. Application Data

(60) Provisional application No. 61/151,950, filed on Feb. 12, 2009.

(51) Int. Cl.
*G06K 9/32*     (2006.01)
(52) U.S. Cl.
USPC ............. 382/300; 345/505; 345/87; 715/716
(58) Field of Classification Search
None
See application file for complete search history.

(56) References Cited

U.S. PATENT DOCUMENTS

| 5,986,635 A  | * | 11/1999 | Naka et al. ............... 715/716 |
| 6,369,787 B1 | * | 4/2002 | Wu et al. ............... 345/87 |
| 6,704,463 B1 | * | 3/2004 | Okada et al. ............... 382/300 |
| 6,724,948 B1 |   | 4/2004 | Lippincott |
| 6,781,586 B1 | * | 8/2004 | Ohta ............... 345/505 |
| 2003/0206246 A1 |   | 11/2003 | De Haan et al. |

FOREIGN PATENT DOCUMENTS

| EP | 1533899 A1 | 5/2005 |
| GB | 2207029 A | 1/1989 |
| WO | 9000780 A1 | 1/1990 |
| WO | 9016035 A2 | 12/1990 |
| WO | 9841029 A1 | 9/1998 |
| WO | 02096113 A1 | 11/2002 |
| WO | 2005055139 A1 | 6/2005 |
| WO | 2005106787 A1 | 11/2005 |

OTHER PUBLICATIONS

Eldon et al., "Using the TMC2301 Image Resampling Sequencer," Microprocessors and Microsystems, Mar. 1, 1990, vol. 14, No. 2, pp. 107-118, IPC Business Press Ltd., London, GB.

(Continued)

*Primary Examiner* — Tsung-Yin Tsai
(74) *Attorney, Agent, or Firm* — Lando & Anastasi, LLP

(57) ABSTRACT

Input pixel values associated with input pixel positions having a first spacing along a direction are received and processed to determine output pixel values associated with output pixel positions having a second spacing along the direction, from respective combinations of input pixel values weighted by coefficients given by an interpolation function. In a downscaling operation, the second spacing is larger than the first spacing, and the weighting coefficients represent values of the interpolation function expanded spatially by an expansion factor equal to the ratio of the second spacing to the first spacing.

18 Claims, 3 Drawing Sheets

(56) References Cited

OTHER PUBLICATIONS

Fahnestock et al., "The maintenance of sharpness in magnified digital images," Computer Vision Graphics and Image Processing, Jul. 1, 1984, vol. 27, No. 1, pp. 32-45.
International Search Report dated Mar. 2, 2010 for corresponding Application No. PCT/EP2009/065985.
Kim et al., "Motion-adaptive alternate gamma drive for flicker-free motion-blur reduction," Journal of SID 17/3, 2009, pp. 203-212.
Ngo, "Image resizing and enhanced digital video compression," EDN—Electrical Design News, Jan. 4, 1996, vol. 41, pp. 145-148, 150, Reed Business Information, Highlands Ranch, CO.

\* cited by examiner

SCALING METHOD AND DEVICE FOR IMAGE SIGNALS

BACKGROUND OF THE INVENTION

The present invention relates to scaling of image signals. It is advantageously used for up- or downscaling video frames, but also applicable to still images.

Downscaling of digital images, i.e. representing a high-resolution image signal at a lower resolution, requires an anti-aliasing operation to avoid viewing artifacts in the downscaled image.

Downscaling is used in TV sets for converting high-definition (HD) contents, or pictures to do picture overlays. Typical downscaling ratios can be 4 or more. Downscaling is also used in set top boxes for similar reasons. In these applications, upscaling can also be useful for displaying images received at a resolution lower than that available for display. Downscaling is also used in digital cameras, where multi-megapixel images shot by the camera module must be rendered on the small display of the camera which typically has between 0.2 and 1 megapixel only.

In order to perform a proper anti-aliasing, the input image is filtered with filters whose size should increase in proportion to the downscaling ratio. This usually requires an amount of logic which increases with the downscaling ratio. In the case of vertical downscaling, more line buffers are also required, which increases the size and the cost of the component.

There are various ways of performing downscaling with anti-aliasing:
- using an expensive anti-aliasing filter having a large number of multipliers and, for vertical scaling, of line buffers;
- using a non optimal anti-aliasing filter to reduce the logic and memory cost, but with degraded visual quality;
- using multiscale anti-aliasing filters to reduce the implementation cost of the anti-aliasing filtering, but at the expense of more complex architectures.

WO 2005/106787 discloses an apparatus for downscaling digital matrix images by selected ratios. A weighted sum of the values of the input pixels of the matrix image in the area of each output pixel is calculated with weighting coefficients given by the dimension shares of the input pixels in the area of the output pixel, corrected by a scaling factor. This technique can facilitate the implementation of the downscaling operation with a filter of variable size. But the filter that it uses has poor spectral properties, leading to sub-optimal anti-aliasing and degradation of image quality.

There is thus a need for another scaling method providing a good compromise between simplicity of implementation and quality of the downscaled anti-aliased images.

SUMMARY OF THE INVENTION

An image scaling method is proposed, comprising: receiving input pixel values associated with input pixel positions having a first spacing along a direction; and determining output pixel values associated with output pixel positions having a second spacing along said direction, from respective combinations of input pixel values weighted by coefficients given by an interpolation function. In a downscaling operation in which the second spacing is larger than the first spacing, the aforesaid coefficients represent values of the interpolation function expanded spatially by an expansion factor equal to the ratio of the second spacing to the first spacing.

An interpolation function in this context is a function $\phi(.)$ verifying:

$$\phi(0) = 1;$$

$$\phi(j) = 0 \text{ for any integer } j \text{ other than } 0;\text{ and}$$

$$\sum_{j=-\infty}^{+\infty} \phi(s+j) = 1 \text{ for any real number } s.$$

The convolution of such an interpolation function $\phi(.)$ with an input function having non-zero values for arguments that are integers (like the sequence of the input pixels values) results in values that are the same as the input function for integer arguments, and interpolated values between them. The interpolation function $\phi(.)$ typically has a support $]-p, +p[$ centered on 0, whose size is 2p with p being a positive integer.

Any suitable interpolation function $\phi(.)$, selected for its spectral properties, can be used. In particular, the number p can be greater than one, making it possible to use high-order filters with very good anti-aliasing properties. However, p=1 is also satisfactory in certain instances.

For downscaling, the interpolation filter is expanded spatially by the downscaling ratio. It becomes larger if the downscaling ratio is important. Expanding the filter allows cutting off more frequencies from the input signal to provide anti-aliasing. The amount of anti-aliasing is tuned for each downscaling ratio.

In an implementation of the method, the determination of the output pixel values in a downscaling operation comprises, upon receipt of an input pixel value:
- reading respective previous values of a plurality of running sums from a buffer;
- updating said running sum values by adding, to each previous value, said input pixel value weighted by a coefficient representing a respective value of the expanded interpolation function;
- obtaining one of said combinations of weighted input pixel values if computation of a running sum is completed, as the value of the completed running sum; and
- writing the non-completed updated running sum values into the buffer.

Such implementation limits the complexity of the logic used for downscaling. In particular, the buffer size can be made independent from the first and second spacings, and thus independent from the downscaling ratio.

In an embodiment, the second spacing is variable. The method can in particular switch from a downscaling operation to an upscaling operation, i.e. the second spacing being smaller than the first spacing. In such an upscaling operation, each output pixel values can be a sum of input pixel values weighted by respective values of the same interpolation function as used in a downscaling operation. It is then possible to switch seamlessly from downscaling to upscaling and vice-versa, without any jump or discontinuity perceived by the viewer.

The downscaling operation can be implemented such that an output pixel value $y_k$ associated with a k-th output pixel position along said direction for an integer k is:

$$y_k = \frac{1}{N_k} \cdot \sum_{(k\Delta-\varepsilon)/\delta - p\Delta/\delta < \lambda < (k\Delta-\varepsilon)/\delta + p\Delta/\delta} x_\lambda \cdot \phi\left(\frac{\lambda\delta - k\Delta + \varepsilon}{\Delta}\right),$$

where $\delta$ is the first spacing, $\Delta$ is the second spacing, $\varepsilon$ is an offset such that $-\Delta < \varepsilon < \delta$, $x_l$ is an input pixel value associated with an l-th input pixel position along said direction for an integer l and $N_k$ is a normalization factor corresponding to the integer k, the interpolation function $\phi(.)$ having zero values out of the interval $]-p, p[$.

In an embodiment, the input pixel values $x_l$ are received in an order of increasing integer l. The integer l can be a pixel index along a line for downscaling in a horizontal direction, or along a column for downscaling in a vertical direction. The downscaling operation along a direction can then include, upon receipt of an input pixel value $x_l$ associated with an l-th input pixel position along said direction:

reading respective previous values $z_k$ of running sums from a buffer for integers k such that $$\frac{\lambda\delta + \varepsilon}{\Delta} - p < k < \frac{(\lambda - 1)\delta + \varepsilon}{\Delta} + p;$$

taking zero as a previous value $z_k$ of a running sum for any integer k such that $$\frac{(\lambda - 1)\delta + \varepsilon}{\Delta} + p \leq k < \frac{\lambda\delta + \varepsilon}{\Delta} + p;$$

updating said running sum values by adding to each previous value $z_k$, for $$\frac{\lambda\delta + \varepsilon}{\Delta} - p < k < \frac{\lambda\delta + \varepsilon}{\Delta} + p,$$

the respective quantity $$x_\lambda \cdot \phi\left(\frac{\lambda\delta - k\Delta + \varepsilon}{\Delta}\right);$$

writing the updated running sum values into the buffer for the integers k such that $$\frac{(\lambda - 1)\delta + \varepsilon}{\Delta} - p < k < \frac{\lambda\delta + \varepsilon}{\Delta} + p;$$

and outputting the value $z_k$ of a running sum for any integer k such that $$\frac{\lambda\delta + \varepsilon}{\Delta} - p < k \leq \frac{(\lambda - 1)\delta + \varepsilon}{\Delta} - p.$$

Another aspect of the present disclosure relates to an image scaling device, comprising: an input for receiving input pixel values associated with input pixel positions having a first spacing along a direction; and computing logic for determining output pixel values associated with output pixel positions having a second spacing along said direction, from respective combinations of input pixel values weighted by coefficients given by an interpolation function. The computing logic is arranged to carry out a downscaling operation with the second spacing larger than the first spacing and said coefficients representing values of the interpolation function expanded spatially by an expansion factor equal to the ratio of the second spacing to the first spacing.

BRIEF DESCRIPTION THE DRAWINGS

DESCRIPTION OF PREFERRED EMBODIMENTS

Figure 1:
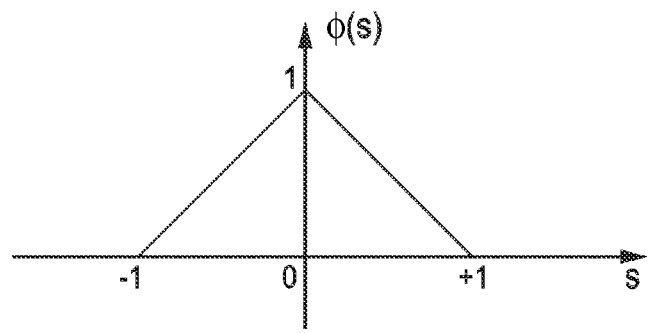
FIGS. 1 and 2 are graphs of exemplary interpolation functions usable to implement the present invention.
Figure 2:
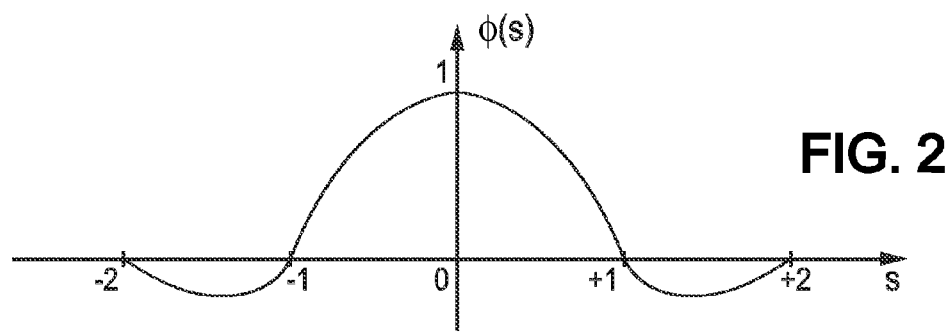

Typical interpolation functions are illustrated in FIGS. 1 and 2. $\phi(.)$ is an interpolation function defined on the interval $]-p, p[$, which can be implemented using a filter having 2p taps, where p is an integer. As indicated above, the interpolation function has the following properties:

$\phi(0)=1$;

$\phi(j)=0$ for any integer j other than 0; and $$\sum_{j=-\infty}^{+\infty} \phi(s + j) = 1$$

for any real number s.

FIG. 1 illustrates the simplest 2-tap linear interpolation filter (p=1): $\phi(s)=1-|s|$ for $-1<s<+1$ and $\phi(s)=0$ for $|s|\geq 1$.

FIG. 2 illustrates a symmetrical 4-tap interpolation filter (p=2), with $\phi(-s)=\phi(s)$ for any s and $\phi(s)=0$ for $|s|\geq 2$. The profile of $\phi(.)$ in the interval $]0, 2[$ can be selected for its spectral properties as well known in the art. Larger support sizes 2p are also possible.

A pixel value $x_l$ or $y_k$ as referred to here may be a luminance value for a gray level image. In the case of color images it can be one of the coordinates in a color representation system such as RGB, YUV, etc. A similar scaling operation is applied to each of the coordinates in the image.

For upscaling, it is common to use directly an interpolation filter of the kind shown in FIG. 1 or 2. This is shown diagrammatically in FIG. 3.

Figure 3:
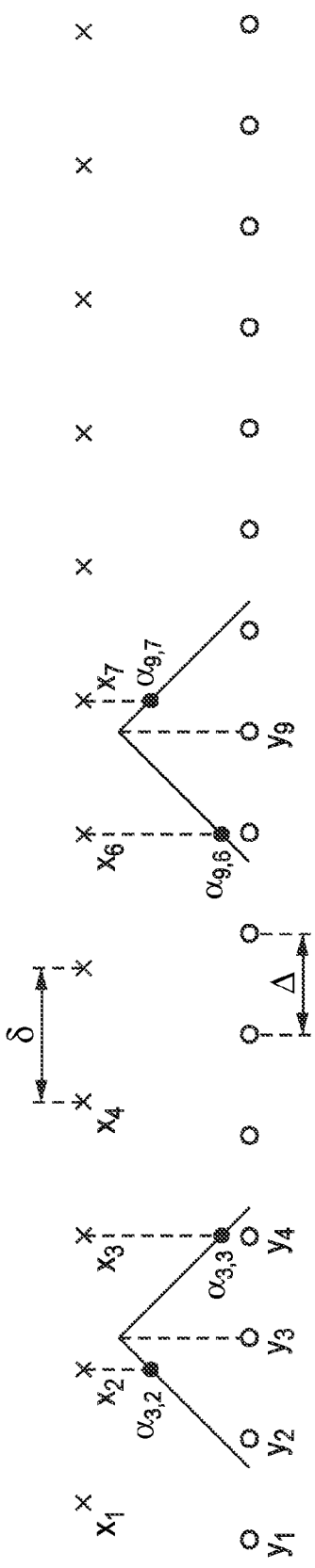
FIGS. 3 and 4 are diagrams which illustrate schematically upscaling and downscaling operations, respectively, in a method according to the invention.
Figure 4:
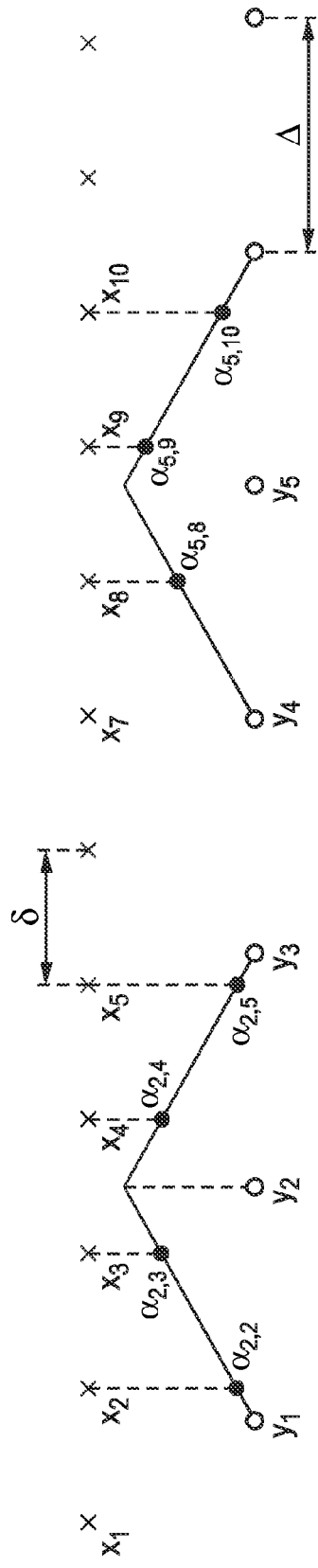

FIGS. 3 and 4 are illustrations of upscaling and downscaling operations along one direction. That direction is depicted horizontally in FIGS. 3 and 4, but it will be appreciated that it can be either the direction of lines or the direction of columns in a two-dimensional image. Referring to the scene being viewed, the input pixel values are spaced by an interval of $\delta$ along the scaling direction; so an input pixel value $x_l$ for an integer index l corresponds to an input pixel position of, e.g., $l\delta-\epsilon_x$ with l=1, 2, 3, etc. along that direction, $\epsilon_x$ being some real offset with $0\leq\epsilon_x<\delta$. The output values on the other hand are spaced by an interval of $\Delta$; so an output pixel value $y_k$ for an integer index k corresponds to an output pixel position of, e.g., $k\Delta-\epsilon_y$ with k=1, 2, 3, etc., $\epsilon_y$ being some real offset with $0\leq\epsilon_y<\Delta$. The offsets $\epsilon_x$, $\epsilon_y$ depend on the alignment conventions to define the pixel positions. It is also possible to refer to the difference $\epsilon=\epsilon_x-\epsilon_y$ which is a real offset such that $-\Delta<\epsilon<\delta$.

In the case of upscaling ($\Delta<\delta$), the expression of an output pixel value $y_k$ is:

$$y_k = \sum_{(k\Delta-\varepsilon)/\delta-p<\lambda<(k\Delta-\varepsilon)/\delta+p} x_\lambda \cdot \phi\left(\frac{\lambda\delta-k\Delta+\varepsilon}{\delta}\right) \quad (1)$$

Each sum in (1) runs on integer indexes l inside an interval $[(k\Delta-\varepsilon)/\delta-p, (k\Delta-\varepsilon)/\delta+p]$ of size 2p. Therefore each sum in (1) contains at most 2p terms. Dotted lines in FIG. 3 (where p=1, $\varepsilon$=0, $\Delta/\delta$=3/4 and $\phi(.)$ is as shown in FIG. 1) indicate the weighting coefficients $\alpha_{3,2}=\phi(-1/4)=3/4$, $\alpha_{3,3}=\phi(3/4)=1/4$ applied to the 2p=2 input pixel values $x_2, x_3$ contributing to $y_3$ in the upscaled image, and the weighting coefficients $\alpha_{9,6}=\phi(-3/4)=1/4$, $\alpha_{9,7}=\phi(1/4)=3/4$ applied to the 2p=2 input pixel values $x_6, x_7$ contributing to $y_9$ in the upscaled image.

For downscaling ($\Delta>\delta$), it is proposed to expand spatially the interpolation function $\phi$ so as to provide proper anti-aliasing. In this case the number of filter taps increases with the downscaling ratio $\Delta/\delta$:

$$z_k = \sum_{(k\Delta-\varepsilon)/\delta-p\Delta/\delta<\lambda<(k\Delta-\varepsilon)/\delta+p\Delta/\delta} x_\lambda \cdot \phi\left(\frac{\lambda\delta-k\Delta+\varepsilon}{\Delta}\right) \quad (2)$$

Note that in formula (2), the denominator in the argument of the interpolation function is $\Delta$ instead of $\delta$ in formula (1). The resulting filtering with the expanded interpolation function does not fulfill the conditions of an interpolation filter. Therefore, an explicit renormalization is required using a divisor. We end up with the following formula:

$$y_k = z_k / N_k \quad (3)$$

where $$N_k = \sum_{(k\Delta-\varepsilon)/\delta-p\Delta/\delta<\lambda<(k\Delta-\varepsilon)/\delta+p\Delta/\delta} \phi\left(\frac{\lambda\delta-k\Delta+\varepsilon}{\Delta}\right) \quad (4)$$

This scaling process has a good property: the amount of anti-aliasing varies continuously with the downscaling ratio $\Delta/\delta$. If $\Delta$ is only slightly larger than $\delta$, e.g. $\Delta$=1.25×$\delta$, only a small amount of anti-aliasing will be performed. When the scaling ratio $\Delta/\delta$ changes continuously, for example due to insertion of a picture with a scaling factor varying in time, no transition or jump will be perceived. In particular, there will be no transition between upscaling and downscaling modes.

Each sum in (2) runs on integer indexes l inside an interval $[(k\Delta-\varepsilon)/\delta-p\Delta/\delta, (k\Delta-\varepsilon)/\delta+p\Delta/\delta]$ of size 2p$\Delta/\delta$. Therefore the sums in (2) contain about most 2p terms. Dotted lines in FIG. 4 (where p=1, $\varepsilon$=0, $\Delta/\delta$=7/4 and $\phi(.)$ is as shown in FIG. 1) indicate the weighting coefficients $$\alpha_{2,2} = \frac{7}{12}\phi(-6/7) = 1/12,$$

$$\alpha_{2,3} = 5/12,$$

$$\alpha_{2,4} = 5/12,$$

$$\alpha_{2,5} = 1/12$$

applied to the input pixel values $x_2, x_3, x_4, x_5$ contributing to $y_2$ in the downscaled image, and the weighting coefficients $\alpha_{5,8}=1/3, \alpha_{5,9}=1/2, \alpha_{5,10}=1/6$ applied to the input pixel values $x_8, x_9, x_{10}$ contributing to $y_5$ in the downscaled image.

Implementation of the upscaling operation according to (1) is straightforward. Buffering 2p input pixels values in first in-first out (FIFO) mode makes it possible to compute an upscaled value $y_k$ using 2p multipliers and an adder upon receipt of each new input pixel value $x_l$.

Figure 5:
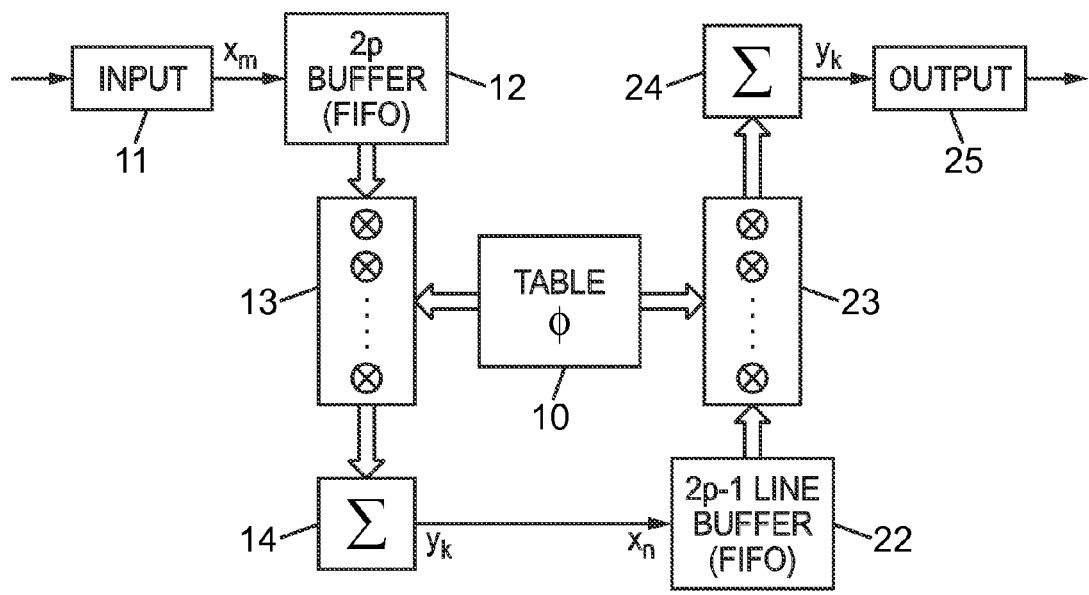
FIG. 5 is a block diagram of an embodiment of a video scaling device used for video upscaling in accordance with the invention.

FIG. 5 illustrates an example of circuit arrangement usable for upscaling video images processed in the raster order, i.e. the pixel values are received, processed and retransmitted by scanning each frame full line by full line, and each line of a frame pixel by pixel from left to right.

In this example, samples of the interpolation function $\phi(.)$ are stored with a sufficient resolution in a memory table 10. Alternatively, the samples $$\phi\left(\frac{\lambda\delta-k\Delta+\varepsilon}{\delta}\right) \text{ or } \phi\left(\frac{\lambda\delta-k\Delta+\varepsilon}{\Delta}\right)$$

can be computed on the fly, particularly if $\phi(.)$ has a simple form such as that illustrated in FIG. 1.

On the input side, a first upscaling operation is performed along each of the successive lines by means of computing logic including a FIFO buffer 12, a set 13 of 2p multipliers and an adder 14. At each clock cycle, an input circuit 11 feeds a new input pixel value $x_m$ to the FIFO buffer 12 whose capacity is 2p pixel values. Once 2p pixel values $x_{m-2p+1}, x_{m-2p+2}, \ldots, x_m$ of the current line have been received in the buffer 12, those 2p values are supplied in parallel to the 2p multipliers of the set 13. The second input of each of the 2p multipliers receives at that time a respective value of the interpolation function read from table 10, such that the multiplier receiving $x_l$ on an input (m−2p<l≤m) receives $$\phi\left(\frac{\lambda\delta-k\Delta+\varepsilon}{\delta}\right)$$

on its other input. The resulting 2p products are the 2p terms of the sum in (1) for an output pixel index k. Those 2p terms are added together by the adder 14 to output the pixel value $y_k$ upscaled horizontally by $\Delta/\delta$.

Due to FIFO management of the buffer 12, one vector of 2p pixel value $x_l$ is supplied to the multipliers 13 at each clock cycle and thus one output pixel value $y_k$ is obtained. The components 10-14 are clocked by a timer (not shown) which also controls the addressing in table 10 to provide the right samples of the interpolation function $\phi(.)$ and the resetting of the contents of buffer 12 at the beginning and end of each line.

The pixels values $y_k$ provided by the adder 14 have been upscaled along one direction, k indexing pixel positions along a line. For vertical upscaling, the computing logic includes a line buffer 22, another set of multipliers 23 and an adder 24. Line buffer 22 is also managed in FIFO mode according to the raster order so as to contain 2p−1 adjacent lines of pixels values directly received from the adder 14. Upon receipt of a new pixel value $y_k=x_n$, 2p input pixel values $x_{n-2p+1}, x_{n-2p+2}, \ldots, x_n$ adjacent to each other along a column become available in the line buffer and those 2p values are supplied in parallel to the 2p multipliers of the set 23. The second input of each of the 2p multipliers receives at that time a respective value of the interpolation function read from table 10, such that the multiplier receiving $x_l$ on an input (n−2p<l≤n) receives $$\phi\left(\frac{\lambda\delta - k\Delta + \varepsilon}{\delta}\right)$$

on its other input. The resulting 2p products are again the 2p terms of the sum in (1) for an output pixel index k. Those 2p terms are added together by the adder 24 to obtain the output pixel value $y_k$ vertically upscaled by $\Delta/\delta$.

Due to FIFO management of the buffer 22, one vector of 2p pixel value $x_l$ is supplied to the multipliers 23 at each clock cycle and thus one output pixel value $y_k$ is supplied, via the output circuit 25, according the raster order. The components 22-25 are also controlled by the timer (not shown), including for management of the contents of buffer 22 at the beginning and end of each column.

It is noted that the first spacing $\delta$ and the second spacing $\Delta$ can be different along lines and along columns. Most of the time, the upscaling ratio $\Delta/\delta$ is the same horizontally and vertically. However, it can also be different.

For downscaling, it is also possible to compute the sums $z_k$ in (2) using a circuit arrangement similar to that of FIG. 5, by increasing the size of the buffers 12, 22 and the number of multipliers in the sets 13, 23. This means that the number of multipliers and input buffers (that are line buffers in the case of vertical scaling) increases in proportion to the downscaling ratio $\Delta/\delta$. The hardware cost can become excessive for high downscaling ratios.

Figure 6:
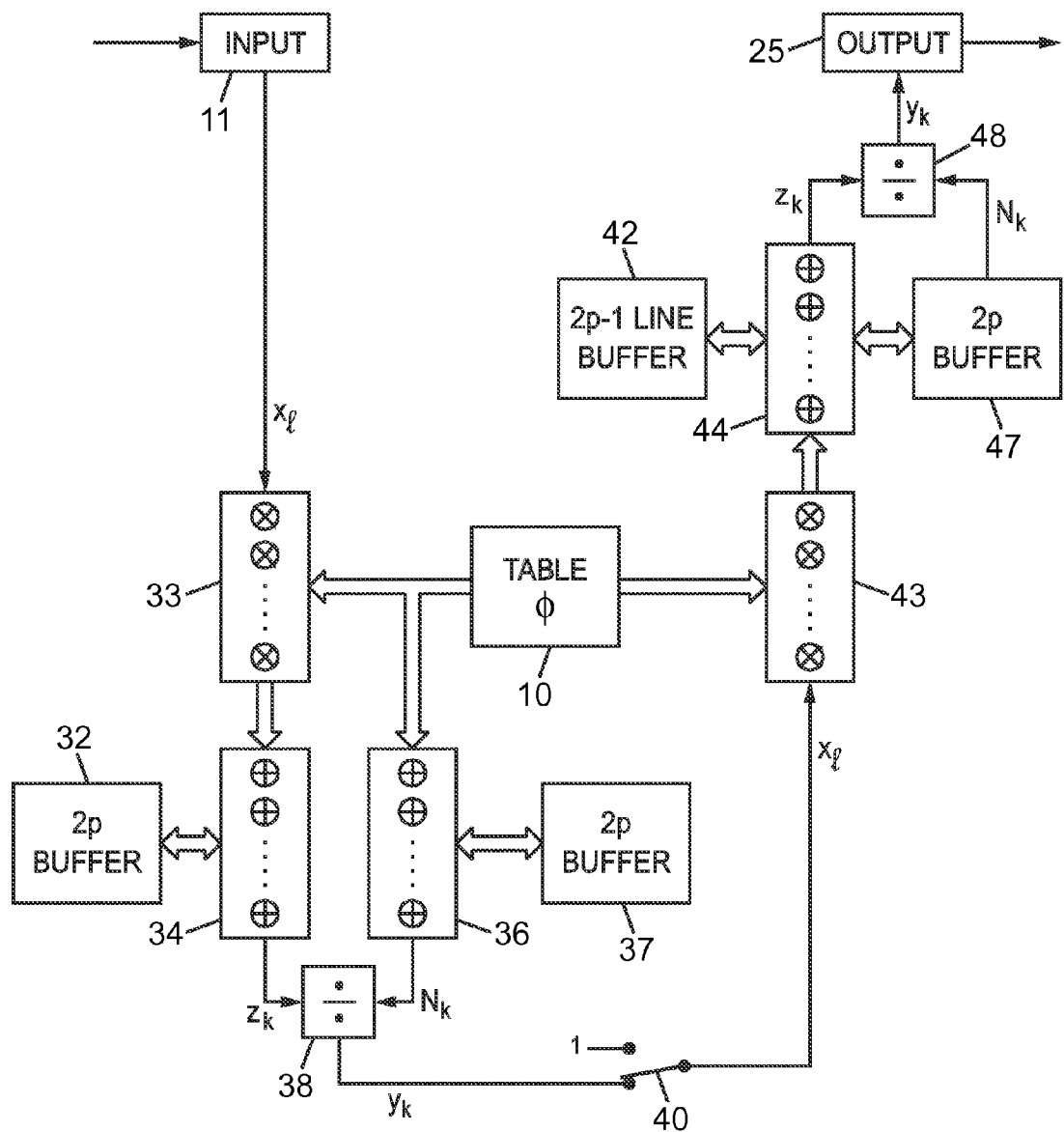
FIG. 6 is a block diagram of another embodiment of a video scaling device used for video downscaling in accordance with the invention.

A more efficient approach consists in clocking the computations with the input sample rate, for example with a circuit arrangement as shown in FIG. 6.

In the device of FIG. 6, for each new input pixel value $x_l$, running sums $z_k$ corresponding to all the output pixel values $y_k$ that are impacted by this input pixel value in (2) are updated. The number of these running sums is only 2p. Normalization according to formula (3) is performed after all the terms of a sum have been added together.

For horizontal downscaling, the device of FIG. 6 has computing logic including a set 33 of 2p multipliers, a set 34 of 2p adders and a buffer 32 on the output side, whose capacity is 2p pixel values. At each clock cycle, a new input pixel value $x_l$ is supplied to an input of each of the 2p multipliers of the set 33. The second input of each of the 2p multipliers receives at that time a respective value $$\phi\left(\frac{\lambda\delta - k\Delta + \varepsilon}{\Delta}\right)$$

of the interpolation function read from table 10, with $$\frac{\lambda\delta + \varepsilon}{\Delta} - p < k \le \frac{\lambda\delta + \varepsilon}{\Delta} + p.$$

The addressing scheme in the memory table 10 is controlled by a timer as in the embodiment of FIG. 5. The resulting 2p products are respectively transferred to the first inputs of the 2p adders of the set 34.

The other input of each adder in the set 34 receives the previous value of a running sum $z_k$ read from buffer 32 and computes an updated value:

$$z_k \leftarrow z_k + x_\lambda \cdot \phi\left(\frac{\lambda\delta - k\Delta + \varepsilon}{\Delta}\right).$$

If there is an index k such that $$\frac{\lambda\delta + \varepsilon}{\Delta} - p < k \le \frac{(\lambda+1)\delta + \varepsilon}{\Delta} - p,$$

the computation of the corresponding combination $z_k$ of weighted input pixel values is completed after processing the input pixel value $x_l$. When this occurs, the completed running sum value $z_k$ is supplied to a divisor 38, and a shift is performed in buffer 32. The other running sum values $z_{k'}$, computed during the current clock cycle $$\left(\frac{(\lambda+1)\delta + \varepsilon}{\Delta} - p < k' \le \frac{\lambda\delta + \varepsilon}{\Delta} + p\right)$$

are written back into the buffer 32 shifted by one memory position, and a new running sum value is introduced into the buffer 32 and set to zero for the index k+2p.

If, in a clock cycle in which the input pixel index is l, no integer k fulfills $$\frac{\lambda\delta + \varepsilon}{\Delta} - p < k \le \frac{(\lambda+1)\delta + \varepsilon}{\Delta} - p,$$

then no completed running sum value $z_k$ is output during the cycle and the updated running sum values $z_k$ are written back into the buffer 32 at the same memory position as they were read.

For horizontal downscaling, the computing logic further includes a set of 2p adders 36 and another buffer 37 of size 2p used to compute the normalization factors $N_k$. The set of adders 36 and the buffer 37 are identical to the set 33 and the buffer 32 described above and they operate in the same manner. The only difference is that the adders receive the weighting coefficients $$\phi\left(\frac{\lambda\delta - k\Delta + \varepsilon}{\Delta}\right)$$

directly from table 10. Comparing (2) and (4), it can be seen that at the time when a completed running sum value $z_k$ becomes available from the set of adders 34, the corresponding normalization factor $N_k$ is also made available from the set of adders 36. Both values $z_k$ and $N_k$ are supplied to the divisor 38 which obtains $y_k$ according to (3).

The latter values $y_k$ (k=1, 2, ...) are horizontally downscaled pixel values which are supplied in the raster order by the divisor 38. Each such pixel value has a horizontal position in the horizontally downscaled image and a vertical position l with reference to the vertical spacing $\delta$ in the original image grid. For vertical downscaling, it is again referred to as $x_l$ (l=1, 2, ...). The $x_l$ values contributing to a pixel having a given horizontal position in the vertical downscaling according to (2)-(4) are not received one after the other from divisor 38. Instead, they are received every M values from divisor 38, where M is the number of pixel per line in the downscaled image. Nevertheless, the vertical downscaling can be performed efficiently with only a set of 2p multipliers 43, a set of 2p adders 44 and 2p−1 lines in the line buffer 42. The number of pixels per line needed in the line buffer 42 is that of the downscaled image.

Each horizontally downscaled pixel values provided by the divisor 38 in a clock cycle forms an input pixel value $x_l$ supplied to an input of each of the 2p multipliers of the set 43. The second input of each of those 2p multipliers receives at that time a respective value $$\phi\left(\frac{\lambda\delta - k\Delta + \varepsilon}{\Delta}\right)$$

of the interpolation function read from table 10, with $$\frac{\lambda\delta + \varepsilon}{\Delta} - p < k \leq \frac{\lambda\delta + \varepsilon}{\Delta} + p.$$

The addressing scheme in the memory table 10 is again controlled by the timer. The resulting 2p products are respectively transferred to the first inputs of the 2p adders of the set 44.

The other input of each adder of the set 44 receives the previous value of a running sum $z_k$ read from buffer 42 and computes an updated value:

$$z_k \leftarrow z_k + x_\lambda \cdot \phi\left(\frac{\lambda\delta - k\Delta + \varepsilon}{\Delta}\right).$$

As previously, if there is an index k such that $$\frac{\lambda\delta + \varepsilon}{\Delta} - p < k \leq \frac{(\lambda+1)\delta + \varepsilon}{\Delta} - p,$$

the computation of the corresponding combination $z_k$ of weighted input pixel values is completed after processing the input pixel value $x_l$. When this occurs, the completed running sum value $z_k$ is output to be supplied to a divisor 48, and a shift is performed along the vertical direction at the current horizontal position in buffer 42. The other running sum values $z_{k'}$, computed during the current clock cycle $$\left(\frac{(\lambda+1)\delta + \varepsilon}{\Delta} - p < k' \leq \frac{\lambda\delta + \varepsilon}{\Delta} + p\right)$$

are written back into the buffer 42 shifted vertically by one memory position, and a new running sum value is introduced into the buffer 42 and set to zero for the vertical index k+2p at the same horizontal position.

If, in a clock cycle in which an input pixel $x_l$ is received by the set of adders 43, no integer k fulfills $$\frac{\lambda\delta + \varepsilon}{\Delta} - p < k \leq \frac{(\lambda+1)\delta + \varepsilon}{\Delta} - p,$$

then no completed running sum value $z_k$ is output during the cycle and the updated running sum values $z_k$ are written back into the buffer 42 at the same memory position as they were read. For processing the next input pixel value $x_{l+1}$, reading and writing in the line buffer 42 is shifted by one position along the horizontal direction.

When a completed running sum value $z_k$ is received at an input of the divisor 48, its other input receives the corresponding normalization factor $N_k$, and the downscaled pixel value $y_k$ is thus obtained. The downscaled pixel values $y_k$ are supplied in the raster order to the output circuit 25.

With the circuit arrangement of FIG. 6, the first spacing δ and the second spacing Δ can also be different along lines and along columns.

For the computation of the normalization factor $N_k$, different methods can be used. One of them was discussed above and illustrated in the left hand part of FIG. 6. It uses an additional set of 2p adders 36 together with a buffer 37 to compute the factors $N_k$ at the same time as the corresponding running sums $z_k$. For horizontal downscaling, the buffer needs 2p memory positions while for vertical downscaling, this method of on-the-fly computation would require a capacity of 2p−1 lines in the buffer.

For vertical downscaling, we can take advantage of the fact that that the normalization factor is the same for a whole line of output samples. For example the factors $N_k$ can be computed on the fly like in the left hand part of FIG. 6 but only for the first pixel of each output line and stored in a buffer to be used for all the pixels of the line. The size of this buffer need only be 2p pixel values.

Another method to compute the normalization factors $N_k$ is illustrated in the right hand part of FIG. 6. It consists in inserting a first column of pixels of value 1 on the left side of the image for vertical downscaling (or a first line of pixels of value 1 for horizontal downscaling), as represented diagrammatically by a switch 40. The same multipliers and running sum buffers as for the pixels of the image are used on this additional column (or line) of '1' to obtain the relevant normalization factors $N_k$. For horizontal downscaling, a buffer having the same size as a downscaled line is needed to store the normalization factors $N_k$ which will be used subsequently when scanning each line. For vertical downscaling, a buffer 47 of size 2p is sufficient to compute a value of the normalization factor $N_k$ at the beginning of each line and this value $N_k$ is read in the buffer 47 in order to normalize the output pixels of the whole line which follows according to (3). The timer controls activation of buffer 47 instead of buffer 42 at the beginning of each column and it sets switch 40 to provide the artificial pixel value 1. When computation of a value $N_k$ is completed, it is supplied to divisor 48 which will receive the value $z_k$ of a weighted combination of input pixels at each pixel position of the following line. The divisor 48 then provides an output pixel value $y_k$ at each pixel position of the current line.

An interesting property of the scaling method and device described above in an exemplary embodiment is that it offers high quality downscaling with smooth variations when the scaling ratio changes, and with a limited memory and logic size.

In practice, the same device can be used for up- and downscaling. For example, the sets of multipliers 33, 43 and the buffers 32, 42 in the embodiment of FIG. 6 can be reconfigured by simple logic to operate as the sets of multipliers 13, 23 and the buffers 12, 22 in the embodiment of FIG. 5 when Δ is smaller than δ. Also, if the computing logic is clocked at a rate which is at least twice that of the incoming pixel values, it can include only one set of 2p multipliers which is used alternately to compute products for horizontal and vertical scaling.

Various other modifications of the embodiments described above will be apparent to the skilled reader without departing from the scope of the present invention.

The inventon claimed is:

1. An image scaling method, comprising:
   receiving input pixel values associated with input pixel positions having a first spacing along a direction; and
   determining output pixel values associated with output pixel positions having a second spacing along said direction, from respective combinations of input pixel values weighted by coefficients given by an interpolation function,
   wherein in a downscaling operation, the second spacing is larger than the first spacing and said coefficients represent values of the interpolation function expanded spatially by an expansion factor equal to the ratio of the second spacing to the first spacing.

2. The method as claimed in claim 1, wherein the determination of the output pixel values in a downscaling operation comprises dividing each combination of weighted input pixel values by a sum of the coefficients involved in said combination.

3. The method as claimed in claim 1, wherein the determination of the output pixel values in a downscaling operation comprises, upon receipt of an input pixel value:
   reading respective previous values of a plurality of running sums from a buffer;
   updating said running sum values by adding, to each previous value, said input pixel value weighted by a coefficient representing a respective value of the expanded interpolation function;
   obtaining one of said combinations of weighted input pixel values if computation of a running sum is completed, as the value of the completed running sum; and
   writing the non-completed updated running sum values into the buffer.

4. The method as claimed in claim 3, wherein the buffer has a size independent from the first and second spacings.

5. The method as claimed in claim 1, wherein the second spacing is variable, and wherein in an upscaling operation, the second spacing is smaller than the first spacing and each output pixel values is a sum of input pixel values weighted by respective values of the interpolation function.

6. The method as claimed in claim 1, wherein in a downscaling operation, an output pixel value $y_k$ associated with a k-th output pixel position along said direction for an integer k is:

$$y_k = \frac{1}{N_k} \cdot \sum_{(k\Delta-\varepsilon)/\delta - p\Delta/\delta < \lambda < (k\Delta-\varepsilon)/\delta + p\Delta/\delta} x_\lambda \cdot \phi\left(\frac{\lambda\delta - k\Delta + \varepsilon}{\Delta}\right),$$

where $\delta$ is the first spacing, $\Delta$ is the second spacing, $\varepsilon$ is an offset such that $-\Delta < \varepsilon \leq \delta$, $x_l$ is an input pixel value associated with an l-th input pixel position along said direction for an integer l, p is a positive integer, $\phi(.)$ is the interpolation function and $N_k$ is a normalization factor corresponding to the integer k, wherein the interpolation function $\phi(.)$ has zero values out of the interval $]-p, p[$.

7. The method as claimed in claim 6, wherein the normalization factor corresponding to an integer k is given by:

$$N_k = \sum_{(k\Delta-\varepsilon)/\delta - p\Delta/\delta < \lambda < (k\Delta-\varepsilon)/\delta + p\Delta/\delta} \phi\left(\frac{\lambda\delta - k\Delta + \varepsilon}{\Delta}\right).$$

8. The method as claimed in claim 6, wherein the input pixel values $x_l$ are received in an order of increasing integer l, and wherein the downscaling operation comprises, upon receipt of an input pixel value $x_l$ associated with an l-th input pixel position along said direction:
   reading respective previous values $z_k$ of running sums from a buffer for integers k such that $$\frac{\lambda\delta + \varepsilon}{\Delta} - p < k < \frac{(\lambda-1)\delta + \varepsilon}{\Delta} + p;$$

taking zero as a previous value $z_k$ of a running sum for any integer k such that $$\frac{(\lambda-1)\delta + \varepsilon}{\Delta} + p \leq k < \frac{\lambda\delta + \varepsilon}{\Delta} + p;$$

updating said running sum values by adding to each previous value $z_k$ for $$p < k < \frac{\lambda\delta + \varepsilon}{\Delta} + p$$

the respective quantity $$x_\lambda \cdot \phi\left(\frac{\lambda\delta - k\Delta + \varepsilon}{\Delta}\right);$$

writing the updated running sum values into the buffer for the integers k such that $$\frac{(\lambda+1)\delta + \varepsilon}{\Delta} - p < k < \frac{\lambda\delta + \varepsilon}{\Delta} + p;$$

and
   outputting the value $z_k$ of a running sum for any integer k such that $$\frac{\lambda\delta + \varepsilon}{\Delta} - p < k \leq \frac{(\lambda+1)\delta + \varepsilon}{\Delta} - p.$$

9. The method as claimed in claim 8, wherein the output value $z_k$ of a running sum for an integer k is further divided by the normalization factor $N_k$ to obtain an output pixel value $y_k$.

10. The method as claimed in claim 8, wherein for the downscaling operation applied along a direction of lines of an image, said buffer has a capacity of 2p pixel values.

11. The method as claimed in claim 8, wherein for the downscaling operation applied along a direction of columns of an image, said buffer has a capacity of 2p−1 lines of pixel values.

12. The method as claimed in claim 6, wherein the integer p defining a support size of the interpolation function φ(.) is greater than one.

13. The method as claimed in claim 6, wherein the second spacing is variable, and wherein in an upscaling operation with the second spacing Δ smaller than the first spacing δ, an output pixel value $y_k$ associated with a k-th output pixel position along said direction for an integer k is:

$$y_k = \sum_{(k\Delta-\varepsilon)/\delta - p < \lambda < (k\Delta-\varepsilon)/\delta + p} x_\lambda \cdot \phi\left(\frac{\lambda\delta - k\Delta + \varepsilon}{\delta}\right).$$

14. The method as claimed in claim 1, wherein the downscaling operation is applied first along a direction of lines of an image and then again along a direction of columns of the image.

15. An image scaling device, comprising:
   an input for receiving input pixel values associated with input pixel positions having a first spacing along a direction; and
   computing logic for determining output pixel values associated with output pixel positions having a second spacing along said direction, from respective combinations of input pixel values weighted by coefficients given by an interpolation function,
   wherein the computing logic is arranged to carry out a downscaling operation with the second spacing larger than the first spacing and said coefficients representing values of the interpolation function expanded spatially by an expansion factor equal to the ratio of the second spacing to the first spacing.

16. The device as claimed in claim 15, wherein the computing logic comprises:
   a buffer for storing respective values of running sums; and
   update logic responsive to an input pixel value in a downscaling operation for:
      reading respective previous running sum values from the buffer;
      updating the read running sum values by adding, to each previous value, said input pixel value weighted by a coefficient representing a respective value of the expanded interpolation function;
      obtaining one of said combinations of weighted input pixel values if computation of a running sum is completed, as the value of the completed running sum; and
      writing the non-completed updated running sum values back into the buffer.

17. The device as claimed in claim 15, wherein in a downscaling operation, an output pixel value $y_k$ associated with a k-th output pixel position along said direction for an integer k is:

$$y_k = \frac{1}{N_k} \cdot \sum_{(k\Delta-\varepsilon)/\delta - p\Delta/\delta < \lambda < (k\Delta-\varepsilon)/\delta + p\Delta/\delta} x_\lambda \cdot \phi\left(\frac{\lambda\delta - k\Delta + \varepsilon}{\Delta}\right),$$

where δ is the first spacing, Δ is the second spacing, ε is an offset such that $-\Delta < \varepsilon < \delta$, $x_l$ is an input pixel value associated with an l-th input pixel position along said direction for an integer l, p is a positive integer, φ(.) is the interpolation function and $N_k$ is a normalization factor corresponding to the integer k, wherein the interpolation function φ(.) has zero values out of the interval ]−p, p[.

18. The device as claimed in claim 17, wherein the integer p defining a support size of the interpolation function φ(.) is greater than one.

* * * * *

UNITED STATES PATENT AND TRADEMARK OFFICE
CERTIFICATE OF CORRECTION

PATENT NO. : 8,588,553 B2
APPLICATION NO. : 13/148779
DATED : November 19, 2013
INVENTOR(S) : Christophe Bernard It is certified that error appears in the above-identified patent and that said Letters Patent is hereby corrected as shown below:

In the Specification:

In Column 2, Lines 59-65, delete "position along said direction for an integer k is:

$$y_k = \frac{1}{N_k} \cdot \sum_{(k\Delta-\varepsilon)/\delta - p\Delta/\delta < \lambda < (k\Delta-\varepsilon)/\delta + p\Delta/\delta} x_\lambda \cdot \phi\left(\frac{\lambda\delta - k\Delta + \varepsilon}{\Delta}\right),$$

" and insert
-- position along said direction for an integer k is:

$$y_k = \frac{1}{N_k} \cdot \sum_{(k\Delta-\varepsilon)/\delta - p\Delta/\delta < \ell < (k\Delta-\varepsilon)/\delta + p\Delta/\delta} x_\ell \cdot \phi\left(\frac{\ell\delta - k\Delta + \varepsilon}{\Delta}\right),$$

--, therefor.

In Column 3, Lines 13-19, delete "a buffer for integers k such that $$\frac{\lambda\delta + \varepsilon}{\Delta} - p < k < \frac{(\lambda-1)\delta + \varepsilon}{\Delta} + p;$$

" and insert
-- a buffer for integers k such that $$\frac{\ell\delta + \varepsilon}{\Delta} - p < k < \frac{(\ell-1)\delta + \varepsilon}{\Delta} + p;$$

--, therefor.

In Column 3, Lines 21-25, delete "integer k such that $$\frac{(\lambda-1)\delta + \varepsilon}{\Delta} + p \leq k < \frac{\lambda\delta + \varepsilon}{\Delta} + p;$$

" and insert
-- integer k such that $$\frac{(\ell-1)\delta + \varepsilon}{\Delta} + p \leq k < \frac{\ell\delta + \varepsilon}{\Delta} + p;$$

--, therefor.

Signed and Sealed this
Fifteenth Day of April, 2014

Michelle K. Lee
*Deputy Director of the United States Patent and Trademark Office*

CERTIFICATE OF CORRECTION (continued)
U.S. Pat. No. 8,588,553 B2

In Column 3, Lines 27-34, delete "updating said running sum values by adding to each previous value $z_k$, for $$\frac{\lambda\delta + \varepsilon}{\Delta} - p < k < \frac{\lambda\delta + \varepsilon}{\Delta} + p,$$

" and insert

-- updating said running sum values by adding to each previous value $z_k$, for $$\frac{\ell\delta + \varepsilon}{\Delta} - p < k < \frac{\ell\delta + \varepsilon}{\Delta} + p,$$

--, therefor.

In Column 3, Lines 35-40, delete "the respective quantity $$x_\lambda \cdot \phi\left(\frac{\lambda\delta - k\Delta + \varepsilon}{\Delta}\right);$$

" and insert

-- the respective quantity $$x_\ell \cdot \phi\left(\frac{\ell\delta - k\Delta + \varepsilon}{\Delta}\right);$$

--, therefor.

In Column 3, Lines 43-48, delete "the integers k such that $$\frac{(\lambda - 1)\delta + \varepsilon}{\Delta} - p < k < \frac{\lambda\delta + \varepsilon}{\Delta} + p;$$

" and insert

-- the integers k such that $$\frac{(\ell+1)\delta + \varepsilon}{\Delta} - p < k < \frac{\ell\delta + \varepsilon}{\Delta} + p;$$

--, therefor.

In Column 3, Lines 50-55, delete "such that $$\frac{\lambda\delta + \varepsilon}{\Delta} - p < k \leq \frac{(\lambda - 1)\delta + \varepsilon}{\Delta} - p.$$

" and insert

-- such that $$\frac{\ell\delta + \varepsilon}{\Delta} - p < k \leq \frac{(\ell+1)\delta + \varepsilon}{\Delta} - p.$$

--, therefor.

In Column 4, Line 4, delete "BRIEF DESCRIPTION THE DRAWINGS" and insert -- BRIEF DESCRIPTION OF THE DRAWINGS --, therefor.

In Column 5, Lines 2-5, delete "pixel value $y_k$ is:

$$y_k = \sum_{(k\Delta - \varepsilon)/\delta - p < \lambda < (k\Delta - \varepsilon)/\delta + p} x_\lambda \cdot \phi\left(\frac{\lambda\delta - k\Delta + \varepsilon}{\delta}\right) \quad (1)$$

" and insert

-- pixel value $y_k$ is:

$$y_k = \sum_{(k\Delta - \varepsilon)/\delta - p < \ell < (k\Delta - \varepsilon)/\delta + p} x_\ell \cdot \phi\left(\frac{\ell\delta - k\Delta + \varepsilon}{\delta}\right) \quad (1)$$

--, therefor.

CERTIFICATE OF CORRECTION (continued)  
U.S. Pat. No. 8,588,553 B2

Page 3 of 7

In Column 5, Lines 21-25, delete "the downscaling ratio $\Delta/\delta$:

$$z_k = \sum_{(k\Delta-\varepsilon)/\delta - p\Delta/\delta < \lambda < (k\Delta-\varepsilon)/\delta + p\Delta/\delta} x_\lambda \cdot \phi\left(\frac{\lambda\delta - k\Delta + \varepsilon}{\Delta}\right) \qquad (2)$$

" and insert

-- the downscaling ratio $\Delta/\delta$:

$$z_k = \sum_{(k\Delta-\varepsilon)/\delta - p\Delta/\delta < \ell < (k\Delta-\varepsilon)/\delta + p\Delta/\delta} x_\ell \cdot \phi\left(\frac{\ell\delta - k\Delta + \varepsilon}{\Delta}\right) \qquad (2)$$

--, therefor.

In Column 5, lines 34-40, delete "We end up with the following formula:

$$y_k = z_k / N_k \qquad (3)$$

where $$N_k = \sum_{(k\Delta-\varepsilon)/\delta - p\Delta/\delta < \lambda < (k\Delta-\varepsilon)/\delta + p\Delta/\delta} \phi\left(\frac{\lambda\delta - k\Delta + \varepsilon}{\Delta}\right) \qquad (4)$$

" and insert

-- We end up with the following formula:

$$y_k = z_k / N_k \qquad (3)$$

where $$N_k = \sum_{(k\Delta-\varepsilon)/\delta - p\Delta/\delta < \ell < (k\Delta-\varepsilon)/\delta + p\Delta/\delta} \phi\left(\frac{\ell\delta - k\Delta + \varepsilon}{\Delta}\right) \qquad (4)$$

--, therefor.

In Column 6, Lines 15-21, delete "Alternatively, the samples $\phi\left(\frac{\lambda\delta - k\Delta + \varepsilon}{\delta}\right)$ or $\phi\left(\frac{\lambda\delta - k\Delta + \varepsilon}{\Delta}\right)$," and insert -- Alternatively, the samples $\phi\left(\frac{\ell\delta - k\Delta + \varepsilon}{\delta}\right)$ or $\phi\left(\frac{\ell\delta - k\Delta + \varepsilon}{\Delta}\right)$ --, therefor.

In Column 6, Lines 36-40, delete "receives $\phi\left(\frac{\lambda\delta - k\Delta + \varepsilon}{\delta}\right)$," and insert -- receives $\phi\left(\frac{\ell\delta - k\Delta + \varepsilon}{\delta}\right)$ --, therefor.

In Column 7, Lines 1-5, delete " $\phi\left(\frac{\lambda\delta - k\Delta + \varepsilon}{\delta}\right)$ ," and insert -- $\phi\left(\frac{\ell\delta - k\Delta + \varepsilon}{\delta}\right)$ --, therefor.

In Column 7, Lines 47-53, delete "time a respective value $\phi\left(\dfrac{\lambda\delta - k\Delta + \varepsilon}{\Delta}\right)$," and insert -- time a respective value $\phi\left(\dfrac{\ell\delta - k\Delta + \varepsilon}{\Delta}\right)$ --, therefor.

In Column 7, Lines 54-59, delete "of the interpolation function read from table 10, with $\dfrac{\lambda\delta + \varepsilon}{\Delta} - p < k \leq \dfrac{\lambda\delta + \varepsilon}{\Delta} + p.$" and insert -- of the interpolation function read from table 10, with $\dfrac{\ell\delta + \varepsilon}{\Delta} - p < k \leq \dfrac{\ell\delta + \varepsilon}{\Delta} + p.$ --, therefor.

In Column 8, Lines 1-4, delete " $z_k \leftarrow z_k + x_\lambda \cdot \phi\left(\dfrac{\lambda\delta - k\Delta + \varepsilon}{\Delta}\right).$ " and insert -- $z_k \leftarrow z_k + x_\ell \cdot \phi\left(\dfrac{\ell\delta - k\Delta + \varepsilon}{\Delta}\right).$ --, therefor.

In Column 8, Lines 6-10, delete "If there is an index k such that $\dfrac{\lambda\delta + \varepsilon}{\Delta} - p < k \leq \dfrac{(\lambda + 1)\delta + \varepsilon}{\Delta} - p,$" and insert -- If there is an index k such that $\dfrac{\ell\delta + \varepsilon}{\Delta} - p < k \leq \dfrac{(\ell+1)\delta + \varepsilon}{\Delta} - p,$ --, therefor.

In Column 8, Lines 17-22, delete "during the current clock cycle $\left(\dfrac{(\lambda + 1)\delta + \varepsilon}{\Delta} - p < k' \leq \dfrac{\lambda\delta + \varepsilon}{\Delta} + p\right)$" and insert -- during the current clock cycle $\left(\dfrac{(\ell+1)\delta + \varepsilon}{\Delta} - p < k' \leq \dfrac{\ell\delta + \varepsilon}{\Delta} + p\right)$ --, therefor.

In Column 8, Lines 27-32, delete "integer k fulfills $\dfrac{\lambda\delta + \varepsilon}{\Delta} - p < k \leq \dfrac{(\lambda + 1)\delta + \varepsilon}{\Delta} - p,$" and insert -- integer k fulfills $\dfrac{\ell\delta + \varepsilon}{\Delta} - p < k \leq \dfrac{(\ell+1)\delta + \varepsilon}{\Delta} - p,$ --, therefor.

In Column 8, Lines 43-49, delete "coefficients $\phi\left(\dfrac{\lambda\delta - k\Delta + \varepsilon}{\Delta}\right)$," and insert -- coefficients $\phi\left(\dfrac{\ell\delta - k\Delta + \varepsilon}{\Delta}\right)$ --, therefor.

In Column 9, Lines 9-14, delete "that time a respective value $\phi\left(\dfrac{\lambda\delta - k\Delta + \varepsilon}{\Delta}\right)$," and insert -- that time a respective value $\phi\left(\dfrac{\ell\delta - k\Delta + \varepsilon}{\Delta}\right)$ --, therefor.

In Column 9, Lines 16-20, delete "of the interpolation function read from table 10, with
$$\dfrac{\lambda\delta + \varepsilon}{\Delta} - p < k \leq \dfrac{\lambda\delta + \varepsilon}{\Delta} + p.$$
" and insert -- of the interpolation function read from table 10, with
$$\dfrac{\ell\delta + \varepsilon}{\Delta} - p < k \leq \dfrac{\ell\delta + \varepsilon}{\Delta} + p.$$
--, therefor.

In Column 9, Lines 27-32, delete "computes an updated value:
$$z_k \leftarrow z_k + x_\lambda \cdot \phi\left(\dfrac{\lambda\delta - k\Delta + \varepsilon}{\Delta}\right).$$
" and insert -- computes an updated value:
$$z_k \leftarrow z_k + x_\ell \cdot \phi\left(\dfrac{\ell\delta - k\Delta + \varepsilon}{\Delta}\right).$$
--, therefor.

In Column 9, Lines 34-39, delete "As previously, if there is an index k such that
$$\dfrac{\lambda\delta + \varepsilon}{\Delta} - p < k \leq \dfrac{(\lambda+1)\delta + \varepsilon}{\Delta} - p,$$
" and insert -- As previously, if there is an index k such that
$$\dfrac{\ell\delta + \varepsilon}{\Delta} - p < k \leq \dfrac{(\ell+1)\delta + \varepsilon}{\Delta} - p,$$
--, therefor.

In Column 9, Lines 46-50, delete "computed during the current clock cycle
$$\left(\dfrac{(\lambda+1)\delta + \varepsilon}{\Delta} - p < k' \leq \dfrac{\lambda\delta + \varepsilon}{\Delta} + p\right)$$
" and insert -- computed during the current clock cycle $$(\frac{(\ell+1)\delta+\varepsilon}{\Delta}-p < k' \leq \frac{\ell\delta+\varepsilon}{\Delta}+p)$$

--, therefor.

In Column 9, Lines 57-63, delete "the set of adders 43, no integer k fulfills $$\frac{\lambda\delta+\varepsilon}{\Delta} - p < k \leq \frac{(\lambda+1)\delta+\varepsilon}{\Delta} - p.$$

" and insert

-- the set of adders 43, no integer k fulfills $$\frac{\ell\delta+\varepsilon}{\Delta} - p < k \leq \frac{(\ell+1)\delta+\varepsilon}{\Delta} - p,$$

--, therefor.

In Column 11, Line 5, delete "inventon" and insert -- invention --, therefor.

In the Claims:

In Claim 6, Column 11, Lines 54-58, delete "is:

$$y_k = \frac{1}{N_k} \cdot \sum_{(k\Delta-\varepsilon)/\delta-p\Delta/\delta < \lambda < (k\Delta-\varepsilon)/\delta+p\Delta/\delta} x_\lambda \cdot \phi\left(\frac{\lambda\delta - k\Delta + \varepsilon}{\Delta}\right),$$

" and insert -- is:

$$y_k = \frac{1}{N_k} \cdot \sum_{(k\Delta-\varepsilon)/\delta-p\Delta/\delta < \ell < (k\Delta-\varepsilon)/\delta+p\Delta/\delta} x_\ell \cdot \phi\left(\frac{\ell\delta - k\Delta + \varepsilon}{\Delta}\right),$$

--, therefor.

In Claim 7, Column 12, Lines 3-8, delete "

$$N_k = \sum_{(k\Delta-\varepsilon)/\delta-p\Delta/\delta < \lambda < (k\Delta-\varepsilon)/\delta+p\Delta/\delta} \phi\left(\frac{\lambda\delta - k\Delta + \varepsilon}{\Delta}\right).$$

"

and insert --

$$N_k = \sum_{(k\Delta-\varepsilon)/\delta-p\Delta/\delta < \ell < (k\Delta-\varepsilon)/\delta+p\Delta/\delta} \phi\left(\frac{\ell\delta - k\Delta + \varepsilon}{\Delta}\right).$$

--, therefor.

In Claim 8, Column 12, Lines 15-57, delete "a buffer for integers k such that $$\frac{\lambda\delta+\varepsilon}{\Delta} - p < k < \frac{(\lambda-1)\delta+\varepsilon}{\Delta} + p;$$

taking zero as a previous value $z_k$ of a running sum for any integer k such that $$\frac{(\lambda-1)\delta+\varepsilon}{\Delta} + p \leq k < \frac{\lambda\delta+\varepsilon}{\Delta} + p;$$

updating said running sum values by adding to each previous value $z_k$ for $$p < k < \frac{\lambda\delta+\varepsilon}{\Delta} + p$$

the respective quantity

CERTIFICATE OF CORRECTION (continued)
U.S. Pat. No. 8,588,553 B2

$$x_\lambda \cdot \phi\left(\frac{\lambda\delta - k\Delta + \varepsilon}{\Delta}\right);$$

writing the updated running sum values into the buffer for the integers k such that $$\frac{(\lambda + 1)\delta + \varepsilon}{\Delta} - p < k < \frac{\lambda\delta + \varepsilon}{\Delta} + p;$$

and outputting the value $z_k$ of a running sum for any integer k such that $$\frac{\lambda\delta + \varepsilon}{\Delta} - p < k \leq \frac{(\lambda + 1)\delta + \varepsilon}{\Delta} - p.$$ " and insert -- a buffer for integers k such that $$\frac{\ell\delta + \varepsilon}{\Delta} - p < k < \frac{(\ell-1)\delta + \varepsilon}{\Delta} + p;$$

taking zero as a previous value $z_k$ of a running sum for any integer k such than $$\frac{(\ell-1)\delta + \varepsilon}{\Delta} + p \leq k < \frac{\ell\delta + \varepsilon}{\Delta} + p;$$

updating said running sum values by adding to each previous value $z_k$ for $$\frac{\ell\delta + \varepsilon}{\Delta} - p < k < \frac{\ell\delta + \varepsilon}{\Delta} + p$$

the respective quantity $$x_\ell \cdot \phi\left(\frac{\ell\delta - k\Delta + \varepsilon}{\Delta}\right);$$

writing the updated running sum values into the buffer for the integers k such that $$\frac{(\ell+1)\delta + \varepsilon}{\Delta} - p < k < \frac{\ell\delta + \varepsilon}{\Delta} + p; \text{ and}$$

outputting the value $z_k$ of a running sum for any integer k such that $$\frac{\ell\delta + \varepsilon}{\Delta} - p < k \leq \frac{(\ell+1)\delta + \varepsilon}{\Delta} - p.$$ --, therefor.

In Claim 13, Column 13, Lines 8-14, delete "said direction for an integer k is:

$$y_k = \sum_{(k\Delta-\varepsilon)/\delta - p < \lambda < (k\Delta-\varepsilon)/\delta - p} x_\lambda \cdot \phi\left(\frac{\lambda\delta - k\Delta + \varepsilon}{\delta}\right).$$ " and insert said direction for an integer k is:

$$y_k = \sum_{(k\Delta-\varepsilon)/\delta - p < \ell < (k\Delta-\varepsilon)/\delta + p} x_\ell \cdot \phi\left(\frac{\ell\delta - k\Delta + \varepsilon}{\delta}\right).$$ --, therefor.

In Claim 17, Column 14, Lines 19-25, delete "is:

$$y_k = \frac{1}{N_k} \cdot \sum_{(k\Delta-\varepsilon)/\delta - p\Delta/\delta < \lambda < (k\Delta-\varepsilon)/\delta + p\Delta/\delta} x_\lambda \cdot \phi\left(\frac{\lambda\delta - k\Delta + \varepsilon}{\Delta}\right),$$ " and insert -- is:

$$y_k = \frac{1}{N_k} \cdot \sum_{(k\Delta-\varepsilon)/\delta - p\Delta/\delta < \ell < (k\Delta-\varepsilon)/\delta + p\Delta/\delta} x_\ell \cdot \phi\left(\frac{\ell\delta - k\Delta + \varepsilon}{\Delta}\right),$$ --, therefor.